United States Patent [19]

Higbee et al.

[11] 4,307,853

[45] Dec. 29, 1981

[54] REWIND PREVENTION FOR DUAL SPOOL RETRACTORS

[75] Inventors: Wallace C. Higbee, Romeo; Gary D. Kuntzman, Ferndale, both of Mich.

[73] Assignees: The Firestone Tire & Rubber Company, Akron, Ohio; General Motors Corporation, Detroit, Mich.

[21] Appl. No.: 105,373

[22] Filed: Dec. 19, 1979

[51] Int. Cl.³ .................. A62B 35/02; B65H 75/48
[52] U.S. Cl. ............................ 242/107.7; 280/807; 280/808
[58] Field of Search ............. 242/107.4 R–107.4 E, 242/107.6, 107.7; 280/801–808; 297/474–480, 483, 484, 486

[56] References Cited

U.S. PATENT DOCUMENTS

| | | | |
|---|---|---|---|
| 4,002,311 | 1/1977 | Fisher et al. | 242/107.7 |
| 4,034,931 | 7/1977 | Fisher et al. | 242/107.4 D |
| 4,065,070 | 12/1977 | Pilarski et al. | 242/107.4 A |
| 4,135,683 | 1/1979 | Stephenson et al. | 242/107.4 A |
| 4,149,683 | 4/1979 | Fisher et al. | 242/107.7 |
| 4,164,336 | 8/1979 | Higbee et al. | 242/107.4 A |

*Primary Examiner*—John M. Jillions
*Attorney, Agent, or Firm*—William J. Morriss; Charles E. Leahy

[57] ABSTRACT

A dual spool retractor structure wherein one of the spools is prevented from retraction until a predetermined amount of retraction occurs in the other of the spools.

9 Claims, 3 Drawing Figures

REWIND PREVENTION FOR DUAL SPOOL RETRACTORS

The present invention is a combination of elements to achieve a selected sequence of rewind in dual spool retractors as are used in safety harness of the automotive and aircraft type. Dual spool retractors have been found especially useful in situations where one spool controls, for example, the extension and retraction of lap webbing and the other spool controls extension of shoulder belt webbing and yet the two portions of webbing are coordinated in movement and sequencing so that upon rewind, when slack occurs in the webbing, that one spool leads the other in rewind. This is useful in passive restraint arrangements and also in three point restraint harness devices and the two spools are mounted in a common frame, usually have a common locking pawl and the locking pawl may be operable by vehicle sensitive means such as a pendulum, acceleration sensing means or otherwise.

BACKGROUND OF THE INVENTION

Typical dual spool retractors are well known in the patent art as in the U.S. Pat. Nos. 4,065,070 to Regis Pilarski and Gerald Yates and 4,164,336 to Wallace Higbee and Robert Rumpf. The retractor spools are spring loaded to apply a return bias constantly seeking to return all loose webbing to the spool. Comfort mechanisms comprising selective means for prevention of rewind are also well known in the retractor art as, for example, the U.S. Pat. Nos. 4,002,311, 4,034,931 and 4,149,683 to Robert C. Fisher and Cecil A. Collins. In such devices, the seat belt restraint user can pick a point in the protraction of webbing to prevent the force spring of the rewind spring from acting on the webbing while the webbing is in selected use position. In such devices, withdrawal of webbing from the spool is not impaired so that the occupant can lean forward to adjust his seating position or to reach vehicle controls. However, such devices are known to prevent the rewinding of the belts when otherwise desired; for example, when an active seat belt is unbuckled to permit egress of the seat occupant from the vehicle. Accordingly, U.S. Pat. No. 3,973,786 issued to Lloyd W. Rogers, Jr. provides a device which is responsive to movement of the door from the closed to the open position to disengage the winding prevention device so that the spring may rewind the webbing upon the reel.

A principle advantage of the present invention is that the rewinding prevention device is disabled without the necessity of providing a mechanical, electrical or hydraulic connection between the door and the webbing retractor.

The present invention combines the dual spool retractor structures with the comfort type structures to disable the rewind in one of the dual spools and provides a control linkage selectively operated by the other spool to disable the comfort type structure at a preselected point so that rewind thereafter proceeds in the first spool. The consequence is a sequence of retraction which is extremely beneficial in dual spool retractor installations. The construction is relatively simple since both spools are on a common frame and a rewind prevention means is secured to one of the spools. Then a release element which is selectively operable is connected to the rewind prevention means for releasing it. An actuator means, operable from the other of the spools which is free to rewind, selectively engages said release and at a predetermined point of retraction in the second mentioned spool the release element is actuated which frees the first mentioned spool by unblocking the rewind prevention means. This is achieved compactly and without complicated mechanism. In pendulum operated systems, the present invention simplifies remote activation of the lock pawl means.

Accordingly, the principal object is to provide a dual spool retractor having a means to prevent rewind in one of the spools until there is a selected amount of rewind achieved in the other of the spools.

Another object is to achieve the principal object in a most facile and unexpected way without greatly increasing the cost and with no impairment of reliability.

Other objects, including extension of the use and acceptance of dual spool retractors by materially extending utility, will be further appreciated as the description proceeds.

IN THE DRAWINGS

GENERAL DESCRIPTION

In general, a dual spool retractor having a frame, separate spring motors for each spool, a pair of spools, and lock pawl means that are blockingly engageable with ratchet flanges on the spools and wherein the spools are connected to one of the spring motors for rewind is provided. An actuating means for the pawl is provided. Webbing is wound on the spools and the rewind bias of the spring motors urge complete retraction. One of the spools has a rewind preventing device secured to it and rotatable with the spool. The other spool is free to rotate in the rewind direction. Between the two spools is a release element having one extreme of movement which engages the rewind prevention means on the first mentioned spool in prevention of rewind and which, in another extreme of movement, releases the rewind prevention means. The second mentioned spool at a preselected position trips or moves the release element thereby freeing the rewind prevention structure and allowing the first mentioned spool to commence its rewinding of webbing. As webbing is withdrawn from the first spool and the second spool, the release element moves and as it does so the rewind prevention means is engaged and rewind cannot occur in the first spool until rewind in the second spool has advanced beyond a preselected amount of harness. Thereupon, the rewind prevention means is freed and first spool can pick up slack harness or webbing.

SPECIFIC DESCRIPTION

Figures 1, 2:
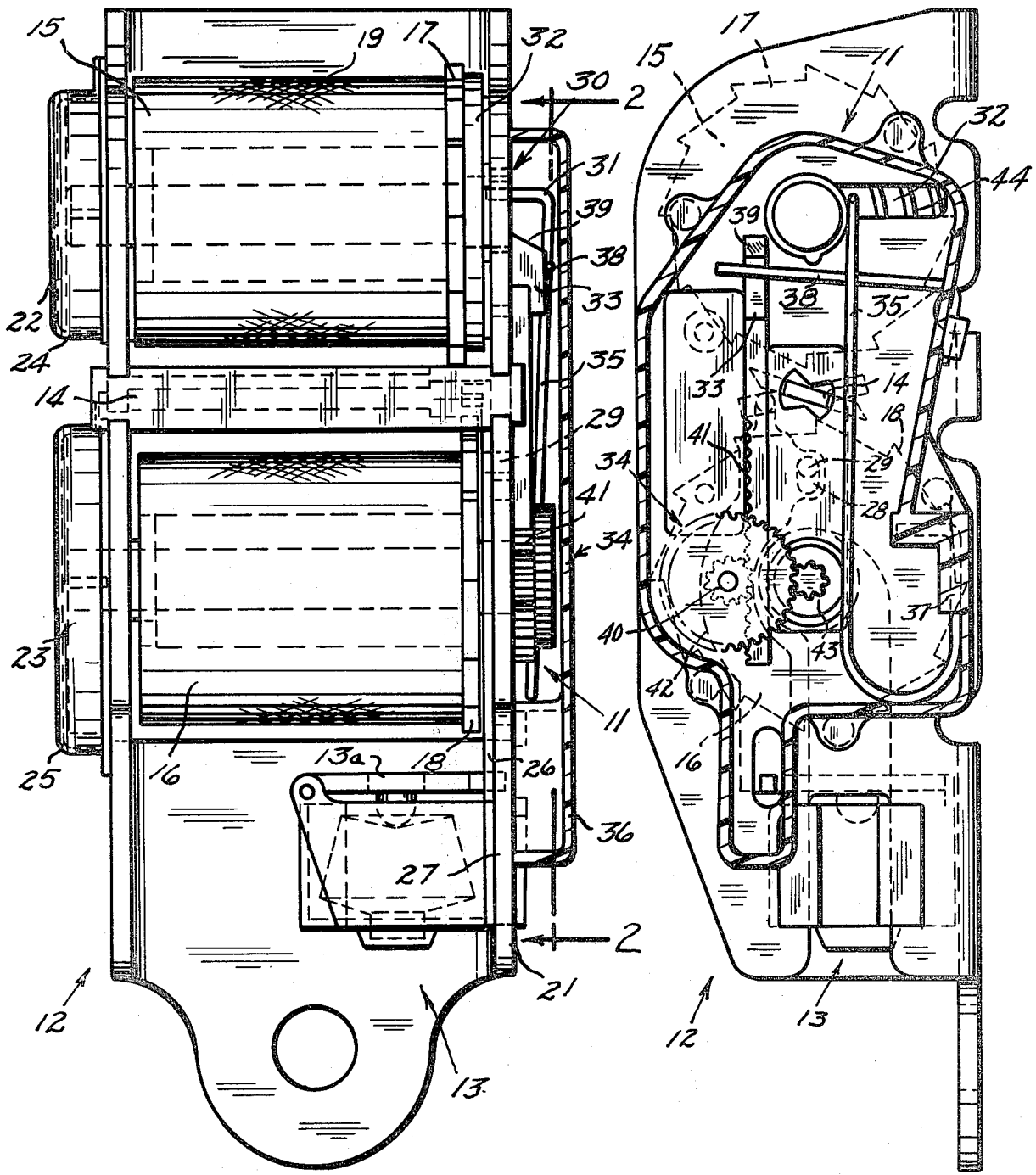
FIG. 1 is a top plan view of a dual spool retractor in accord with the present invention and clearly indicating the compactness of the structure of the present invention in a vehicle sensitive form.
FIG. 2 is an end elevation of the dual spool retractor as sectioned on the line 2—2 of the FIG. 1 and illustrating the simplicity of the inventive structural elements inside the mechanism cover and external of the frame.

Referring with particularity to the drawings and with first particularity to the FIG. 1 thereof, the present rewind prevention structure 11 is found in its operative setting in a dual spool retractor 12. While the dual spool retractor 12 is shown as a vehicle sensitive retractor locked by inertial displacement in the pendulum structure 13, other locking systems are well known in the art, such as acceleration sensitive means responding to webbing pull, and even manual and other forms of pendulum structures acting on the lock pawl 14. It is the intent of the present invention that such other pawl locking systems otherwise employing the rewind prevention of the present invention are within the spirit of the present invention. The pawl 14 in the drawings is shown intermediate the first spool or reel 15 and the second spool or reel 16 so as to blockingly engage the ratchet flanges 17 and 18, respectively, and when so engaged the spools 15 and 16 are prevented from allowing any further protraction of webbing 19 and 20, respectively. To achieve remote actuation of the pawl 14, a lever 26 is secured to the lift plate 13a of the pendulum structure 13 so as to slide in flat journalled relation against the frame check 27 guided by the relation of slot 28 and pin 29 to each other and thereby to activate the pawl 14 at sensed inertial imbalance.

The spools 15 and 16 are journalled for rotation in the common frame 21. The frame 21 is generally channel shaped as shown. Spring rewind motors 22 and 23 are drivably connected to the spools 15 and 16, respectively, in the manner well known in the art as by the connection of flat spiral springs to case or frame 21 and to the shaft of the spools 15 and 16, respectively, and this applies a constant rewind bias to the webbing 19 and 20. Covers 24 and 25 are over the individual motors 22 and 23, respectively.

Upon sensing any slack in the webbing 19 or 20, the motors 22 and 23 wind the slack webbing on the reels or spools 15 and 16, respectively. The motor tension may be overcome for protraction of the webbing provided that the pawl 14 is free of lock engagement with the ratchet wheels 17 and 18. Accordingly, the first drum spool or reel 15, as shown, would be free to rewind separately from the second drum spool or reel 16. As will be seen, the rewind prevention mechanism 11 allows a sequencing of retraction or rewinding so that one spool, as spool 15, can be prevented from rewinding until the spool 16 achieves a predetermined amount of rewind thereby releasing the rewind prevention in the first spool 15. Accordingly, if the rewind prevention mechanism is engaged, the spool 16 leads the rewind of the spool 15.

The rewind prevention mechanism 11 includes a rewind prevention element 30 keyed for rotation with the first spool 15 and having a prevention finger 31 in selected rewind stop engagement and disengagement with the disc 32 and the disc 32 being rotatable by the spool 15 and connected thereto. A release element 33, which is movably connected to the spool 16, as by the gear train 34 and which translates rotational movement to lineal movement, may lift the finger 31 out of stop engagement with the rewind prevention disc 32 and thereupon the spool 15 is free to rewind in accord with the drive of its spring motor 22. Protraction of webbing 20 from the second spool 16 causes retreating motion in the release element 33 and the finger 31 is again restored to its rewind prevention position in engagement with the disc 32. The stop finger 31 is a downturned end of a wire form 35 connected to the cover plate 36 at the end 37 of the wire from 35 opposite the end which includes the integral finger 31. A simple and separate wire form bar 38, also connected at one end to the case or cover plate 36, extends under the wire form 35 to extend the lift range of the release element 33 through the lateral movement of wire form 35. Thus, the release element 33 is ramped at its end and the ramp 39 lifts the bar 38 and finger 31 as the release element 33 is extended to the selected release point as shown best by reference to FIG. 2. By using a rack and pinion drive where the release element 33 is a rack and the pinion 40 is a part of the gear train 34, it is appreciated that the release point for the first spool 15 can be selected by location of the rack 41 in respect to the pinion 40 and by selection of the size and teeth of gear train elements 42 and 43. As rewind occurs in the second spool 16, the rack 41 progressively moves so that the ramp 39 of the release element 33 lifts the finger 31 away from the disc 32 and then the first spool 15 is free to completely rewind. The disc 32 is substantially identical in structure and function to the labyrinth path comfort mechanism discs in the U.S. Pat. Nos. 4,002,311, 4,034,931, and 4,149,683 to Robert C. Fisher and Cecil A Collins and the description therein contained is incorporated by reference as a part of this description. As the spool 15 rotates, the disc 32 rotates with it and in the protracting direction of the rotation the finger 31 and wire form 35 moves lineally outwardly and then is contained at the perimeter of the disc 32 by an annular continuous slot. As retraction occurs, the disc 32 reverses direction of rotation with the spool 15 and the wire form finger 31 moves along a spiral path 44 which connects with the perimeter groove in the disc 32 to a hook-like blocking engagement against an integrally formed ratchet tooth 45. Engagement of finger 31 against the ratchet tooth 45 results in complete prevention of rewind until the obstructing barrier of the finger 31 is removed. As has been seen, the removal of the finger 31 from the labyrinth passages of the disc 32 can occur only when the preselected amount of rewind has occurred in the second spool 16 and the wire form finger 31 is removed as a barrier.

Figure 3:
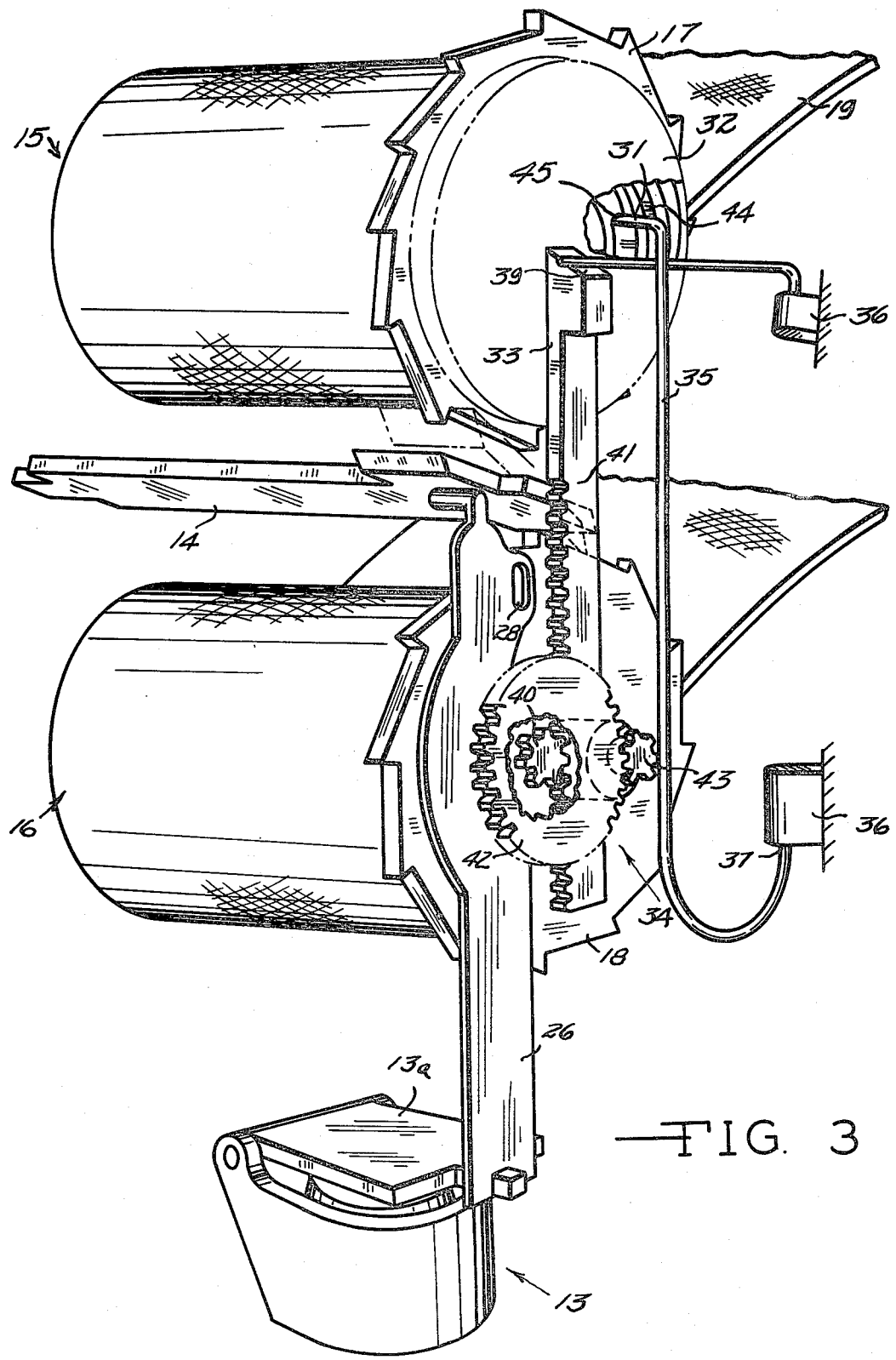
FIG. 3 is a somewhat stylized perspective view of the rewind prevention structure of the present invention separated from the frame and with the cover removed and the rewind spring motors disengaged so that the structure and function are clear.

The FIG. 3 best summarizes the described embodiment of the present invention. The spools 15 and 16 are separately rotated and are separately biased to rewind the webbing 19 and 20. The rewind motors 22 and 23 are not shown. The ratchet flanges 17 and 18 of the drums 15 and 16 are shown and protraction of webbing 19 and 20 from the drums 15 and 16 is achieved by overcoming the rewind bias of the motors 22 and 23. The pawl 14 is between the ratchet flanges 17 and 18 and upon selected movement blocks the spools 15 and 16 from protraction of webbing. Movement of the pawl 14 is by reason of a sensed condition such as inertial imbalance felt by the movement of the pendulum structure 13 which lifts the slider link or lever 26 in movement guided by the slot 28 on a pin 29 extending from the cheek 27 of the frame 21. Upon displacement of the pendulum structure 13 and movement of the lever 26, the pawl 14 is moved by the lever 26 to interference position with the ratchets 17 and 18. The first spool 15 is attached for rotation to the disc 32 which has connected labyrinth grooves in its outer face as previously described. The second spool 16 includes a drive gear 43 which rotates with the spool 16. The drive gear 43 is connected to a gear train 34 which includes pinion 40 and thence to the rack 41. The rack 41 is a part of the release element 33 which is guidably and lineally moved by the gear train 34 in accord with the movement of the second spool 16. The release element 33 has the ramp 39 at its end and thus can selectively lift the finger 31 from the disc 32 by the lift of the wire form 35 via the lever 38. When this occurs, the finger 31 is lifted clear of engagement with any of the ratchet teeth 45 and the spool 15 is then free to retract webbing. As protraction of webbing occurs from the second spool 16, the release element 33 backs away from the bar 38 and allows the finger 31 to re-enter the labyrinth passages or grooves 44 of the disc 32. This does not impair the withdrawal of webbing 19 from the spool 15 but arms the spool 15 to resist retraction when, upon slight retraction at final location of the webbing 19, the finger 31 engages the ratchet teeth 45 in the disc 32. The cover 36 supports the wire form 35 and the bar 38 and otherwise prevents dust and debris intrusion into the mechanism 11. By locating the pendulum structure 13 between the upturned flanges of the channel-like frame 21, the compactness of the dual spool retractor is maintained despite the extension of utility. A simple and reliable rewind sequencing structure for dual spool retractors is the result. The rewind prevention mechanism 11 may be applied to a variety of multispool situations in which selected restraints against retraction are desired and such applications are contemplated as use environments for the present invention.

The invention herein is not limited to the use in conjunction with the labyrinth path rewind prevention mechanism disclosed in the drawing. For example, the winding prevention mechanism of U.S. Pat. No. 4,023,746 issued to Joseph J. Magyar is another suitable mechanism which could be adapted to incorporate the present invention.

The present invention materially extends the use range of multispool retractors to improve passive restraint harness systems.

Having described our invention and the preferred embodiment thereof, those skilled in the art will appreciate changes, modifications and improvements thereon and such changes, modifications and improvements are intended to be included herein limited only by the scope of our hereinafter appended claims.

We claim:

1. A dual spool retractor having a first and second spool, each biased to rewind, and for storage of webbing and including pawl lock means in prevention of harness withdrawal under sensed conditions, the combination including:
   rewind prevention means on said first spool;
   a release element selectively engaging and disabling said rewind prevention means from prevention of retraction; and
   an actuator means connected to said second spool and operably connected to said release element and achieving disabling of said rewind prevention means when said second spool is retracted to a predetermined extent.

2. In dual spool vehicle sensitive retractors having upper and lower spools, a lock pawl operable to lock said spools against withdrawal rotation intermediate said spools, said spools and pawl operably supported in a channel-shaped frame, said upper spool including a spiral labyrinth path comfort disc, and a deceleration sensing element acting against said pawl, the combination comprising:
   a wire form rewind blocking element supported by said frame and resiliently extending into said labyrinth path of said comfort disc and through an opening defined through said frame; and
   means lifting said wire form from said labyrinth path when webbing on said lower spool is retracted to a predetermined extent whereby said upper spool is free to retract.

3. In dual spool vehicle sensitive retractors having upper and lower spools and a lock pawl operable to lock said spools against withdrawal rotation intermediate said spools, said spools and pawl operably supported in a channel-shaped frame, said upper spool including a spiral labyrinth path comfort disc, a deceleration sensing element acting against said pawl, the combination comprising:
   a wire form rewind blocking element supported by said frame and resiliently extending into said labyrinth path of said comfort disc and through an opening defined through said frame;
   a wire form release lever extending under said wire form rewind blocking element; and
   a release lever actuator operably engaged with said release lever and lifting said release lever when webbing on said lower spool is retracted to a predetermined extent whereby said release lever lifts said wire form element out of engagement with said comfort disc.

4. The combination of claim 3 and including a lever element inboard of said frame and at one end contacting said deceleration sensing element and at the other end engaged against said lock pawl, said lever element reaching from said deceleration sensing element to move said lock pawl to lock said spools against withdrawal movement.

5. In the combination of claim 3 wherein a cover supports said wire form and said cover is secured to said frame whereby said wire form is precision located and resiliently biased toward engagement in said spiral labyrinth path and said cover also supporting said wire form release lever and covering all of said elements from intrusion of dust and dirt.

6. In the combination of claim 3 wherein said release lever actuator is a gear train connected to said lower spool and a rack element driven thereby translating rotational movement to linear movement to lift said release lever and thereby disengage said upper spool to rewind.

7. In a dual spool vehicle sensitive retractor for webbing in safety harness structures, said retractor having upper and lower spools biased to full retraction, a pawl intermediate said spools and operable to lock said spools against withdrawal rotation, a frame operably supporting said spools and said pawl, a comfort disc having a spiral labyrinth path secured to said upper spool and rotating therewith, a deceleration sensing element acting on said pawl, the combination comprising:
   a wire form rewind blocking element supported by said frame and resiliently extending through an opening defined in said frame into said labyrinth path of said comfort disc on said upper spool;
   a wire form release lever extending under said wire form rewind blocking element;
   a gear train commencing with a pinion extending from said lower spool and rotatable with said spool and ending with a lineally movable rack, said rack movable toward and away from said wire form release lever and camming said release lever and moving said rewind blocking element from said labyrinth path of said comfort disc upon a predetermined number of rotations of said lower spool; and a push rod inboard of said frame and in contact with said deceleration sensing element in guided operating contact with said lock pawl whereby said spools are locked against withdrawal movement.

8. A seat belt system retractor comprising:

a shoulder belt retractor for winding a shoulder belt to a taut condition about the occupant and permitting unwinding of the shoulder belt;

a lap belt retractor for winding and unwinding a lap belt;

rewind prevention means associated with the shoulder belt retractor selectively engageable to block belt winding by the shoulder belt retractor;

sensing means associated with the lap belt retractor for sensing the occurrence of a predetermined extent of lap belt winding indicative of winding of the lap belt from an extended condition toward a stored condition; and release means connecting said sensing means with the winding prevention means and adapted to disengage the rewind prevention means upon occurrence of the predetermined extent of lap belt winding whereby the shoulder belt is urged to rewind toward a stored condition.

9. In a dual spool seat belt retractor including a housing, a lap belt retractor mounted in said housing and adapted to store a lap belt thereon, a shoulder belt retractor mounted in said housing and adapted to store a shoulder belt thereon, said retractors being rotatable in rewind and extraction directions, and rewind means associated with said retractors and normally exerting a rewind force urging said retractors towards the rewind direction, the improvement comprising:

tension relieving means operatively associated with said shoulder belt retractor and effective in an operable position to relieve the rewind force associated with said shoulder belt retractor and ineffective in an inoperable position to relieve said force; and release means operable to position said tension relieving means in its inoperable position in response to a predetermined number of revolutions of said lap belt retractor in said rewind direction.

* * * * *